(12) United States Patent
Huang et al.

(10) Patent No.: US 7,848,058 B2
(45) Date of Patent: Dec. 7, 2010

(54) VOICE COIL DAMPER

(75) Inventors: Fu-Ying Huang, San Jose, CA (US); Jifang Tian, Fremont, CA (US)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 736 days.

(21) Appl. No.: 11/897,699

(22) Filed: Aug. 30, 2007

(65) Prior Publication Data
US 2009/0059435 A1 Mar. 5, 2009

(51) Int. Cl.
*G11B 21/02* (2006.01)
(52) U.S. Cl. .................... 360/265.8; 360/265
(58) Field of Classification Search .......... 360/265, 360/265.8, 266.4, 264.7, 266.9
See application file for complete search history.

(56) References Cited

U.S. PATENT DOCUMENTS

| | | | |
|---|---|---|---|
| 4,602,175 A * | 7/1986 | Castagna ................... 310/13 |
| 4,728,831 A * | 3/1988 | Cheng ..................... 310/13 |
| 5,790,348 A | 8/1998 | Alfred et al. |
| 5,914,836 A * | 6/1999 | Pottebaum ............... 360/264.8 |
| 6,005,750 A | 12/1999 | Willard et al. |
| 6,252,746 B1 * | 6/2001 | Cho ...................... 360/265.8 |
| 6,392,845 B1 | 5/2002 | Tsuda et al. |
| 6,512,658 B1 | 1/2003 | Jierapipatanakul et al. |
| 6,879,466 B1 | 4/2005 | Oveyssi et al. |
| 6,937,444 B1 | 8/2005 | Oveyssi |
| 6,947,260 B2 | 9/2005 | Dominguez et al. |
| 6,980,401 B1 * | 12/2005 | Narayanan et al. ....... 360/265.8 |
| 7,119,993 B2 | 10/2006 | Zuo et al. |
| 7,145,749 B2 | 12/2006 | Zuo et al. |
| 7,675,714 B1 * | 3/2010 | Yucesan et al. .......... 360/265.8 |
| 2006/0221505 A1 * | 10/2006 | Fujimoto et al. ......... 360/264.7 |

FOREIGN PATENT DOCUMENTS

| JP | 03183348 A | * | 8/1991 |
| JP | 08045205 A | * | 2/1996 |
| JP | 2006286053 A | * | 10/2006 |

OTHER PUBLICATIONS

Huang, et al., "Active Damping in HDD Actuator", *IEEE Transactions on Magnetics*, vol. 37, No. 2, Mar. 2001, 847-849.
Lee, et al., "VCM Design to Improve Dynamic Performance of Actuator in a Disk Drive", *IEEE Transactions on Magnetics*, 2004, 1-2.
Jiang, et al., "A Passive Damper for the Vibration Modes of the Head Actuator in Hard Disk Drive", *Journal of Sound and Vibration*, vol. 220, Issue 4, 1999, 683-694.

* cited by examiner

*Primary Examiner*—William J Klimowicz (57) ABSTRACT

A voice coil for a voice coil motor of a hard disk drive comprises an inner surface of the voice coil, which bounds a central space of the voice coil. A first outer surface of the voice coil is substantially parallel to a second outer surface of the voice coil. A constrained layer damper is attached to the inner surface of the voice coil by a coupler. The constrained layer damper comprises a first constraining layer coupled to a first surface of a viscoelastic damping layer. A second constraining layer is coupled to a second surface of the viscoelastic damping layer. The constrained layer damper is curved in a direction that is substantially perpendicular to the first outer surface of the voice coil and the second outer surface of the voice coil.

16 Claims, 7 Drawing Sheets

VOICE COIL DAMPER

TECHNICAL FIELD

This invention relates generally to the field of direct access storage devices and in particular to the damping of system vibration modes through the use of a constrained layer damper coupled to the inner surface of a voice coil.

BACKGROUND ART

Direct access storage devices (DASD) have become part of every day life, and as such, expectations and demands continually increase for greater speed for manipulating data and for holding larger amounts of data. To meet these demands for increased performance, the mechanical assembly in a DASD device, specifically the Hard Disk Drive (HDD) has undergone many changes.

Vibration can limit the performance of an HDD, and if uncontrolled can render an HDD inoperable. Various methods and systems for controlling vibration are well known in the art. These can range from vibration absorbent materials to extraneous systems such as shock absorbers and active vibration controls systems with feedback loops. When considering a method for controlling vibration, size, cost, and compatibility with the operating environment need to be considered. These considerations become particularly challenging in HDD technology.

SUMMARY OF THE INVENTION

Various embodiments of the present invention are described herein. A voice coil for a voice coil motor of a hard disk drive comprises an inner surface of the voice coil, which bounds a central space of the voice coil. A first outer surface of the voice coil is substantially parallel to a second outer surface of the voice coil. A constrained layer damper is attached to the inner surface of the voice coil by a coupler. The constrained layer damper comprises a first constraining layer coupled to a first surface of a viscoelastic damping layer. A second constraining layer is coupled to a second surface of the viscoelastic damping layer. The constrained layer damper is curved in a direction that is substantially perpendicular to the first outer surface of the voice coil and the second outer surface of the voice coil.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, it will be recognized by one of ordinary skill in the art that embodiments of the present invention may be practiced without these specific details. In other instances, well known methods, procedures, and components have not been described in detail as not to unnecessarily obscure aspects of the present invention.

The discussion will begin with a brief overview of a hard disk drive (HDD) which comprises a comb assembly whereby desirable performance of an HDD can be enabled. The discussion will then focus on embodiments of the present invention by which a damper component when coupled voice coil and consequently to a head stack assembly (HSA) can present desirable dynamic performance of the HSA. The implementation of embodiments of the present invention will then be discussed.

Overview

Figure 1:
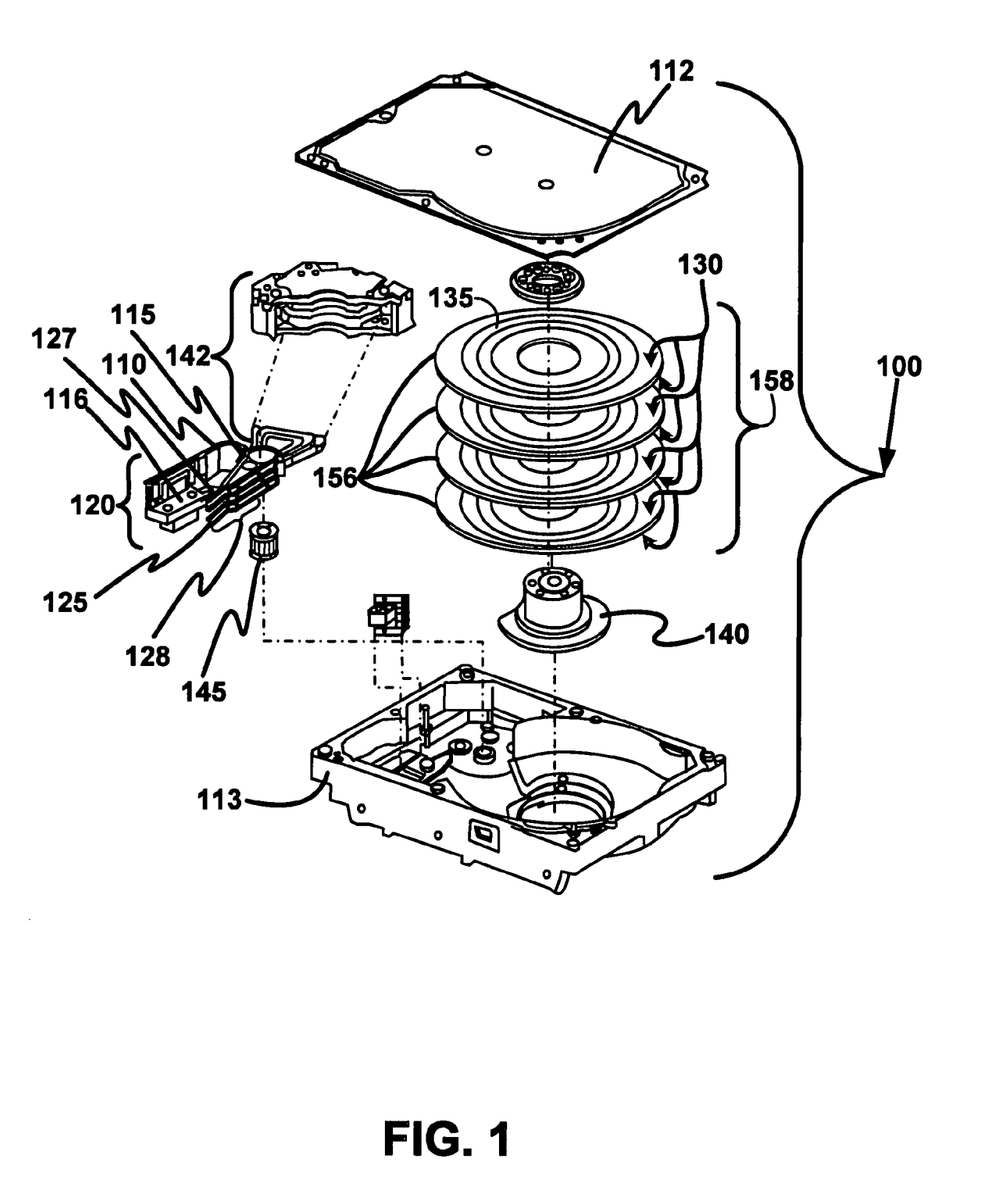
FIG. 1 is an isometric blow-apart of an HDD in accordance with one embodiment of the present invention.

With reference to FIG. 1, an isometric blow-apart of HDD 100 is presented in accordance with an embodiment of this invention. Base casting 113 provides coupling points for components and sub-assemblies such as disk stack 158, voice coil motor (VCM) 142, and HSA 120. Disk stack 158 is coupled to base casting 113 by means of motor-hub assembly 140. Motor-hub assembly 140 will have at least one disk 156 coupled to it such that disk 156 can rotate about an axis common to motor-hub assembly 140 and the center of disk 156. Disk 156 has at least one surface 130 upon which reside data track 135. HSA 120, sometimes referred to as an actuator assembly, comprises in part suspension 127, which suspends hard disk drive slider 125 next to disk surface 130, and connector 116, which conveys data between arm electronics (A/E) 115 and a host system wherein HDD 100 resides. Suspension 127 and hard disk drive slider 125 comprise in part head gimbal assembly (HGA) 128. Flex cable 110, which is part of HSA 120, conveys data between connector 116 and A/E 115.

HSA 120 is coupled pivotally to base casting 113 by means of pivot bearing 145, such that VCM 142 can move HGA 128 with slider 125 arcuately across disk surface 130. Upon assembly of HSA 120, disk stack 158, VCM 142, and other components with base casting 113, cover 112 is coupled to base casting 113 to enclose these components and sub-assemblies into HDD 100.

Figure 2:
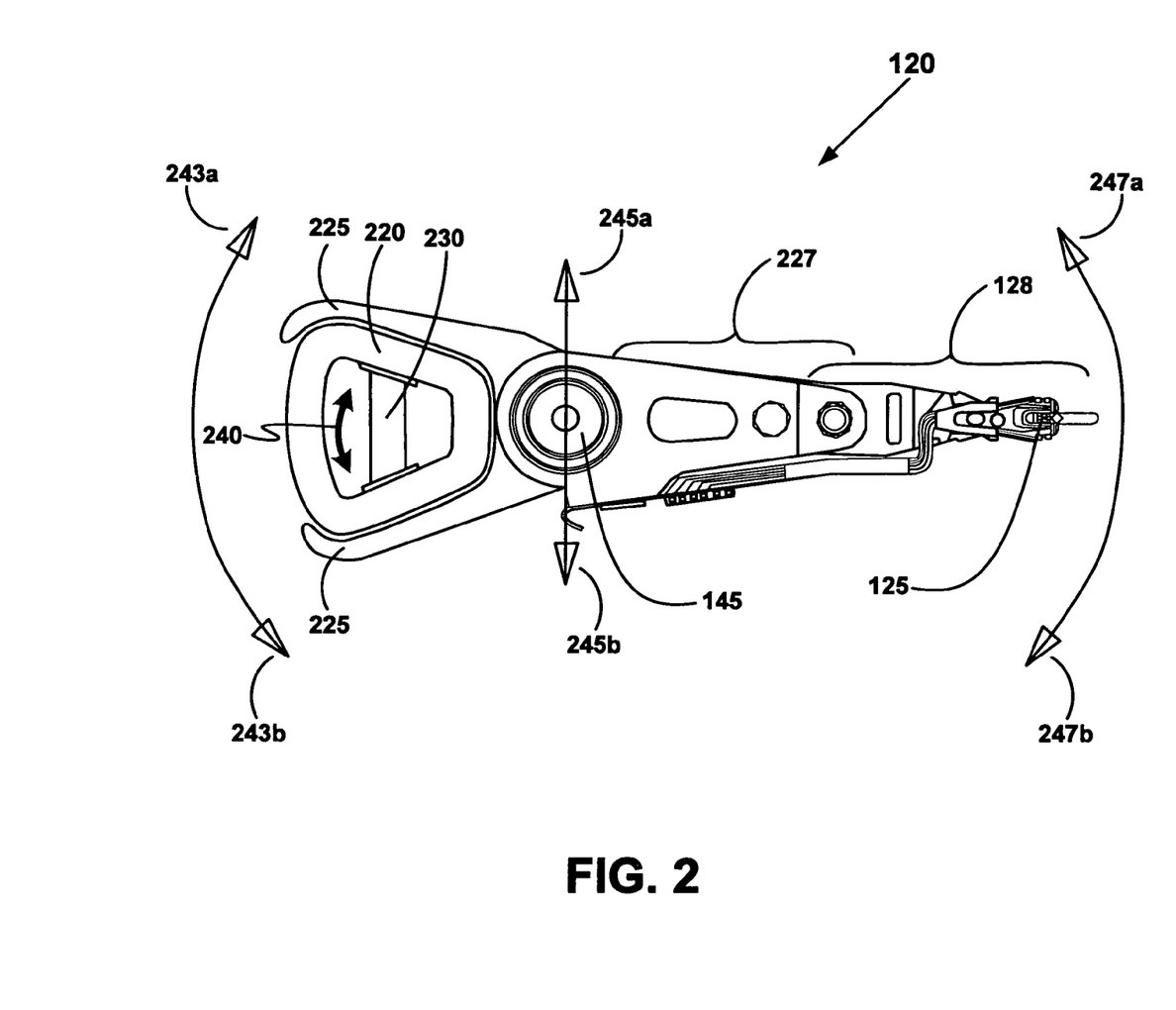
FIG. 2 is a plan view of a head stack assembly (HSA) in accordance with one embodiment of the present invention.

With reference to FIG. 2 a plan view of a head stack assembly (HSA) 120 is presented in accordance with one embodiment of the present invention. One of ordinary skill in the art can appreciate that as HSA 120 is actuated by VCM 142, HSA 120 is excited to vibrate with varying modes of vibration. These modes of vibration are in part the result the interactions of: torque 240 generated by VCM 142 and voice coil 220; the overall stiffness and localized stiffness of HSA 120; the overall mass and localized mass of HSA 120; and the speed and frequency at which torque 240 is applied and redirected.

When referring to localized mass and localized stiffness, HSA 120 can be viewed as a series of masses comprising slider 125, suspension 127, arm 227, yoke legs 225, and voice coil 220. (Yoke legs 225 are also known as a coil holder and tail fins. The term yoke legs 225 will be used in describing the embodiments of this invention.) There exist several other localized masses that for the sake of brevity and clarity are not presented here. The portions of HSA 120 that connect the localized masses have intrinsic stiffness or springiness. It is well known in the arts of physics and mechanical engineering that a series of springs and masses when interconnected will have a variety of modes and frequencies of vibration, dependent upon the magnitudes of masses, spring constants, and excitation forces.

Of particular interest to the performance of an HDD and to embodiments of the present invention are vibration modes of HSA 120, known as system modes. In some companies, system modes are referred to as "butterfly" modes because when viewed in plan view, HSA 120 resembles a butterfly in flight as localized masses on either side of pivot bearing 145 rotate in opposite directions about pivot bearing 145. There are several system modes, which are characterized by the order of frequency and the distorted shape of HSA 120 resulting from the vibrations. For example, as presented in FIG. 2, the first system mode is evidenced by the localized masses that are to the left of pivot bearing 145, oscillating in a direction from 243a to 243b; the localized masses that are to the right of pivot bearing 145, oscillating in a direction from 247a to 247b; and pivot bearing 145 translating in a direction from 245b to 245a. The first system mode is characterized as being "out of phase" and usually occurs in a range of 6.0 KHz to 7.5 KHz.

The second system mode, as presented in FIG. 2, is characterized as being "in phase", whereby the localized masses that are to the left of pivot bearing 145, oscillate in a direction from 243a to 243b; the localized masses that are to the right of pivot bearing 145 oscillate in a direction from 247a to 247b; pivot bearing 145 translates in a direction from 245a to 245b. The second system mode usually occurs in a range of 10.0 KHz to 12.0 KHz.

The frequency at which a system mode occurs denotes whether the system mode is a first, second or higher order mode of vibration. The localized masses and their relative motion to each other at various frequencies also implicate which mode of vibration HSA 120 is undergoing. FIG. 2, since it is a plan view of HSA 120, only presents an outermost arm 227, suspension 127 and slider 125. Multiple arms and their associated suspensions and sliders are usually present in HSA 120. These arms and their associated suspensions and sliders can oscillate in or out of phase with other arms, sliders, and suspensions. Such oscillations and relative motion can result in higher system modes.

HSAs are designed with localized masses and stiffness that will result in predictable and constant system modes of vibration, when excited by a VCM torque such as torque 240. If the HSA is designed to have predictable and constant system modes, the servo system, which controls VCM 142 to move slider 125 arcuately across disk surface 130, can be designed to avoid exciting system modes during operation of VCM 142. It would be deleterious to the performance of HDD 100 if VCM 142 were to excite system modes of HSA 120. Exciting a system mode can cause HSA 120 to experience resonance vibration and can make locating slider 125 on data track 135 difficult. Resonance is that physical phenomenon when a frequency of an excitation force causes a structure to vibrate at a similar frequency such that each cycle of vibration is reinforced and continually amplified by the excitation force. During resonance, slider 125 undergoes excursions from data track 135. The magnitude of these excursions is a function of the amplitude of the system mode frequencies. This amplitude is known as gain.

A vibration damper is designed to primarily reduce the gain of the frequency of vibration. There may be a small change in frequency, which is typically due to changing the mass and/or the stiffness of the spring/mass system being damped.

Damping applications for suspension 127 and arm 227 are well understood in the art. These are typically applied to a large surface of suspension 127 and/or arm 227, which is usually designed to be parallel to disk 156 upon assembly into HDD 100. Damping applications are most effective when they move in the direction of the vibration that is being damped. Arm and/or suspension damping applications have little effect on system mode gains, since the planes of these dampers are parallel to the direction of the system modes of vibration. Very little motion due to a system mode of vibration will be imparted into a suspension and/or arm damper.

Physical Description

With reference to FIG. 2, and in accordance with an embodiment of the present invention, a constrained layer damper (CLD) 230 is inserted into voice coil 220. Voice coil 220 of VCM 142 is operable to HDD 100.

Figure 3:
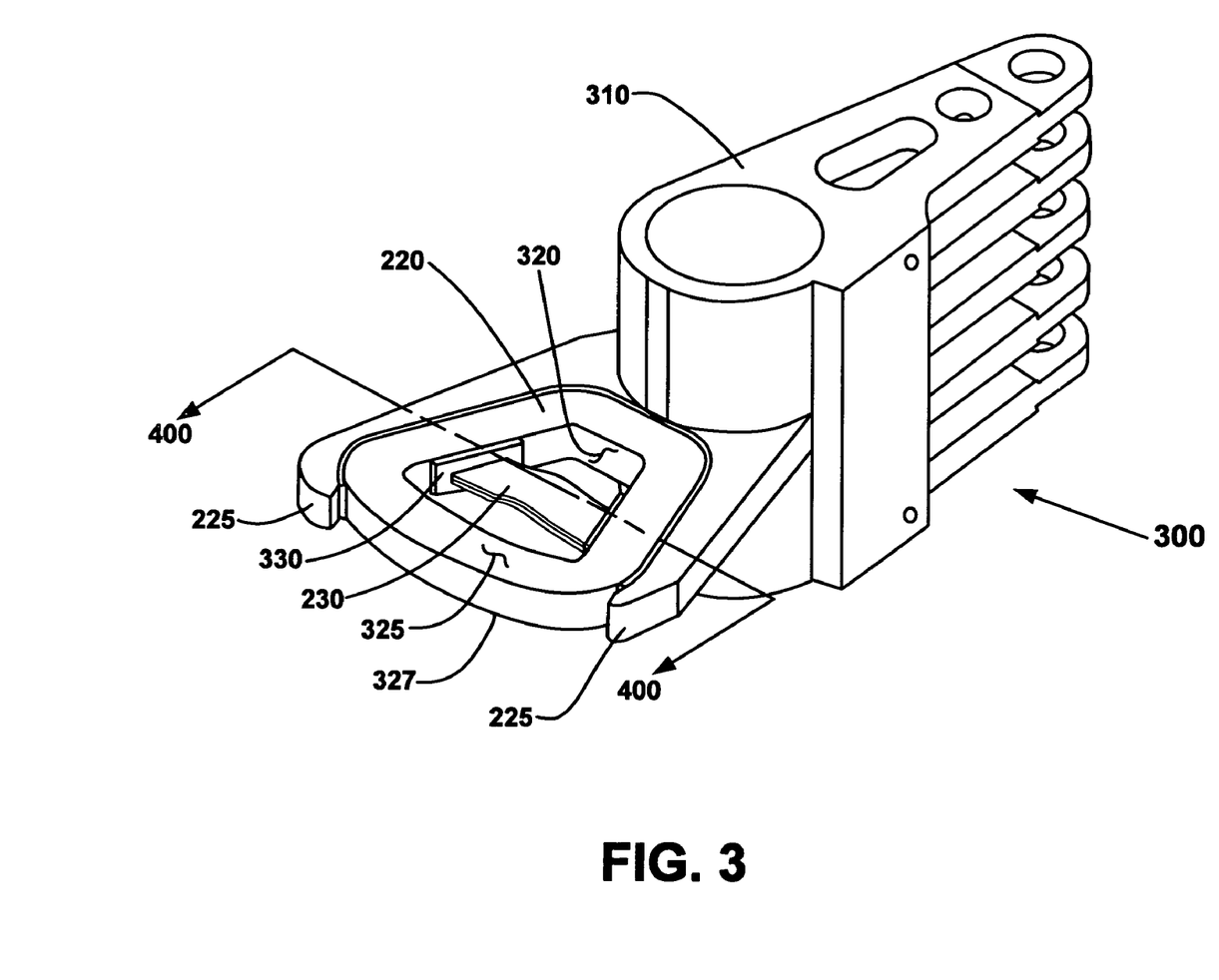
FIG. 3 is an isometric of a comb assembly in accordance with one embodiment of the present invention.

With reference to FIG. 3, an isometric of a comb assembly 300 is presented in accordance with one embodiment of the present invention. Comb assembly 300 comprises comb 310 to which other components such as voice coil 220 can be applied. For the sake of brevity and clarity components that can be associated with a comb assembly, such as flex cable 110 and A/E 115 are not shown. Voice coil 220 comprises at least one wire coiled around a space that is bounded by inner surface 320 comprising the coiled wire. The coiled wire of voice coil 220 constitutes a first outer surface 325 and a second outer surface 327 which are approximately parallel to each other. CLD 230 is attached to inner surface 320 by means of a coupler 330.

Figure 4:
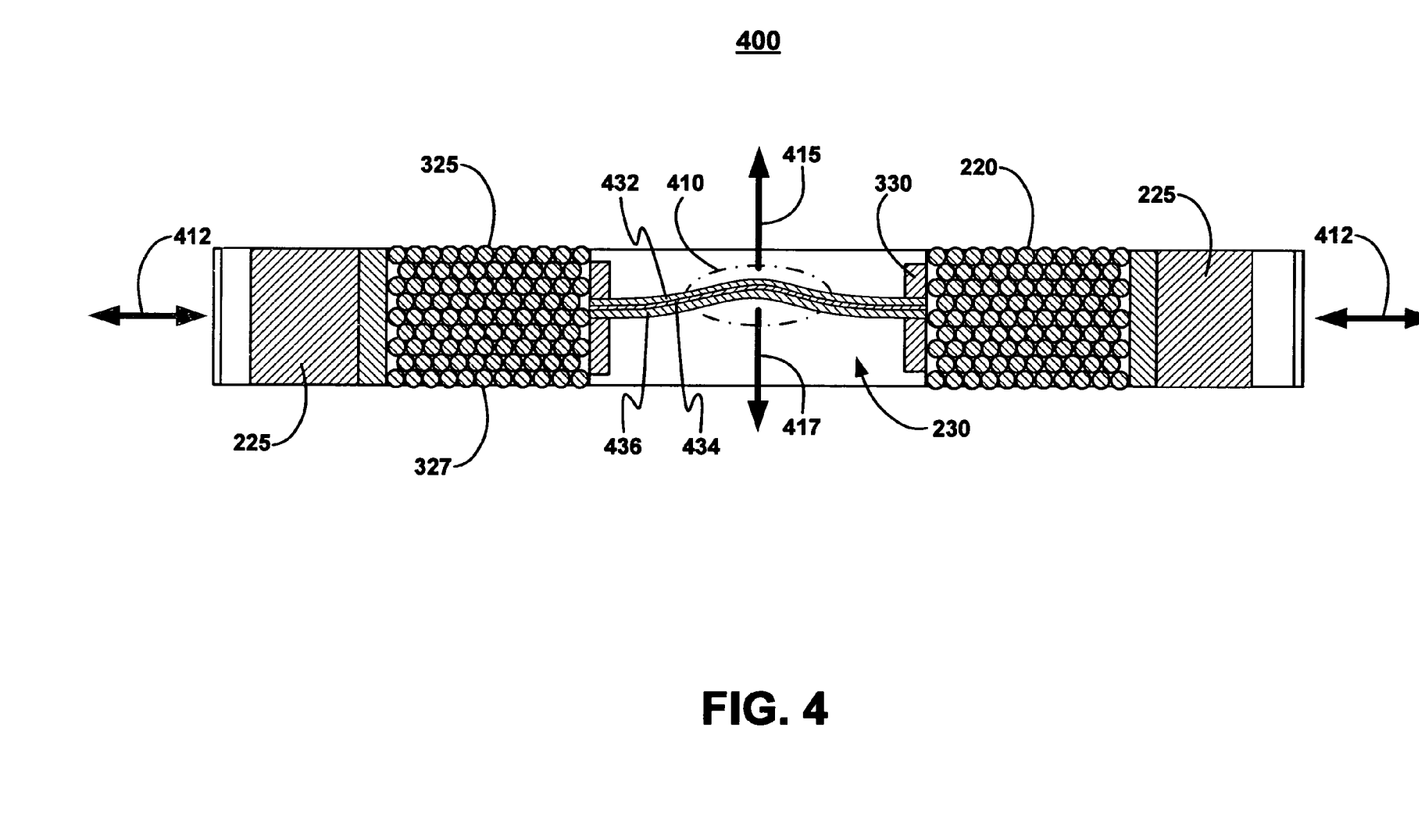
FIG. 4 is a cross-section detail of a comb assembly for an HDD in accordance with one embodiment of the present invention.

With reference to FIG. 4, a cross-section detail 400 of a comb assembly for an HDD is presented in accordance with one embodiment of the present invention. Cross-section detail 400 reveals that CLD 230 comprises a first constraining layer 432, which is coupled to viscoelastic damping layer 434. Constraining layer 436 is also coupled to viscoelastic damping layer 434. The material for constraining layer (432, 436) is chosen for their specific stiffness and compatibility with the HDD environment.

The specific stiffness of a material is its inherent stiffness as compared to its mass. In other words the specific stiffness of a material is the force required to bend a material one unit of distance for one unit of mass of the material. The measurement units of specific stiffness are X Newtons per millimeter per kilogram, where X is the value for specific stiffness.

It is desired to maintain a balance of mass for HSA 120 about pivot bearing 145. For example, if mass is added to the voice coil end of an HSA, an equivalent effective mass (or inertial mass) must be added to the slider end of the HSA to maintain balance. It is also desirable to minimize the overall mass of HSA 120 to minimize the power required of VCM 142 to move slider 125 arcuately across disk surface 130. Therefore it is desirable to keep the mass of CLD 230 to a minimum.

The material for constraining layer (432, 436) of CLD 230 is chosen from a group of plastic and metals that are known for their compatibility in the environment of HDD 100, for their manufacturability, and for their specific stiffness. Examples of metals in this group are stainless steel, aluminum, and high strength copper alloys such as Cu—Ni—Si—Mg, Be—Cu—Ni, and Cu—Ti. Examples of plastics in this group are polyimide and polyester, commonly available from DuPont Corporation as KAPTON and MYLAR.

The stiffness of constraining layer (432,436) is approximately three times stiffer than viscoelastic damping layer 434. It should be appreciated that this ratio of stiffness can be achieved by a combination of the specific stiffness and thickness of constraining layer (432,436). The thickness of a material is related to the material's stiffness by the cubic of the material's thickness. Thickening the material of constraining layer (432,436) will increase the stiffness of constraining layer (432,436), but increasing thickness to increase stiffness can also increase mass. Therefore the design of CLD 230 considers the specific stiffness, thickness and mass of constraining layer (432,436) and viscoelastic damping layer 434.

Viscoelastic damping layer 434 is chosen from a group of materials that are characterized by a property known as lossiness. Lossiness is the characteristic of a material to attenuate oscillations or vibrations. Lossiness is a material's resistance to cyclic motion. As with constraining layer (432,436), compatibility in the environment of HDD 100 and manufacturability are considered when choosing a suitable viscoelastic damping material. Examples of materials that have desirable lossiness, compatibility with the HDD environment, and manufacturability are 3M Corporation products ISD-110, ISD-120, and ISD-142. A characteristic of the above examples of viscoelastic damping materials is their ability to act as a pressure sensitive adhesive. Assembly of CLD 230 comprises: applying viscoelastic damping layer 434 to first constraining layer 432; applying second constraining layer 436 to exposed surface of viscoelastic damping layer 434; and applying pressure to the lamination stack of first constraining layer 432, viscoelastic damping layer 434, and second constraining layer 436. By virtue of viscoelastic damping layer 434 being a pressure sensitive adhesive, the assembly of CLD 230 is achieved.

CLD 230 is attached to inner surface 320 of voice coil 220 by means of coupler 330. In one embodiment of the present invention coupler 330 is a mounting pad juxtaposed to inner surface 320 of voice coil 220. A further embodiment of the present invention incorporates an adhesive with coupler 330 to attach CLD 230 to inner surface 320. Examples of an adhesive adaptable for the purpose of attaching coupler 330 to inner surface 320 are: a pressure sensitive adhesive, an epoxy, a thermal setting adhesive, and a thermal plastic adhesive. An example of using a thermal plastic adhesive to attach coupler 330 to inner surface 320 is to utilize existing thermal plastic adhesive that is present on the wire comprising voice coil 220. Wire used in the fabrication of voice coil 220 may be coated with thermal plastic adhesive so that after being coiled, it is pressed under temperature to fuse the wire into a coil. This pressing procedure also defines the parallelism between first outer surface 325 of voice coil 220 and second outer surface 327 of voice coil 220. First outer surface 325 and second outer surface 327 are substantially parallel to within 0.010 millimeters. Such thermal plastic adhesive is operable to adhering coupler 330 of CLD 230 to inner surface 320.

Well known in the art of voice coil engineering is the method of fabricating a voice coil by wrapping wire around a pre-form known as a bobbin. This method of voice coil fabrication leaves the bobbin remaining as an integral part of the voice coil. In accordance with an embodiment of the present invention, coupler 330 comprises a coil winding bobbin. In accordance with an embodiment of the present invention, coupler 330 is inserted into a space bounded by the inner surface of the coil winding bobbin that will define the shape of voice coil 220. In accordance with another embodiment of the present invention, CLD 230 is fabricated as part of the coil winding bobbin.

Operation

With reference to FIG. 2, it is appreciated that during operation of VCM 142, yoke legs 225 are deflected by torque 240 acting against the inertia of HSA 120.

With reference to FIG. 4, deflection 412 causes yoke legs 225 to be either pushed together or pulled apart. It should also be appreciated that deflection 412 is small in magnitude and is coupled to the previously described system modes of vibration.

Curve 410 in CLD 230 is in a direction 415 that is substantially perpendicular to first outer surface 325 and second outer surface 327 of voice coil 220. Deflection 412 causes CLD 230 to buckle in direction 415 when deflection 412 pushes yoke legs 225 towards CLD 230. Curve 410 causes CLD 230 to buckle preferentially in direction 415.

Without curve 410, the in-plane stiffness of CLD 230 would be indefinite and buckling would bi-stable, i.e. sometimes CLD 230 would buckle in direction 415, and sometimes it would buckle in direction 417. Without curve 410, buckling would occur only after the inertial forces that cause deflection in yoke legs 225, become sufficiently large to overcome the in-plane stiffness of CLD 230. The in-plane stiffness of CLD 230 would be imparted to yoke legs 225 until buckling occurs. Varying and unpredictable stiffness of CLD 230 and consequently of HSA 120 cause the system modes of vibration to be unpredictable and uncontrollable. This will result in poor performance of HDD 100, e.g. seek and settle times, track following, and track density.

A CLD reduces the gain of vibration by transferring strain or displacement energy of a vibrating structure into a viscoelastic damping layer, wherein the viscoelastic damping layer resists the strain energy and dissipates the strain energy as a small amount of heat. The effectiveness of a CLD depends in part on its effectiveness to transfer strain energy (i.e. deflections due to vibration) into a viscoelastic damping layer. Deflection 412 is amplified by the geometry of curve 410 into larger deflections of CLD 230 in direction (415, 417). In so doing strain energy is transferred into viscoelastic damping layer 434.

Figure 5A:
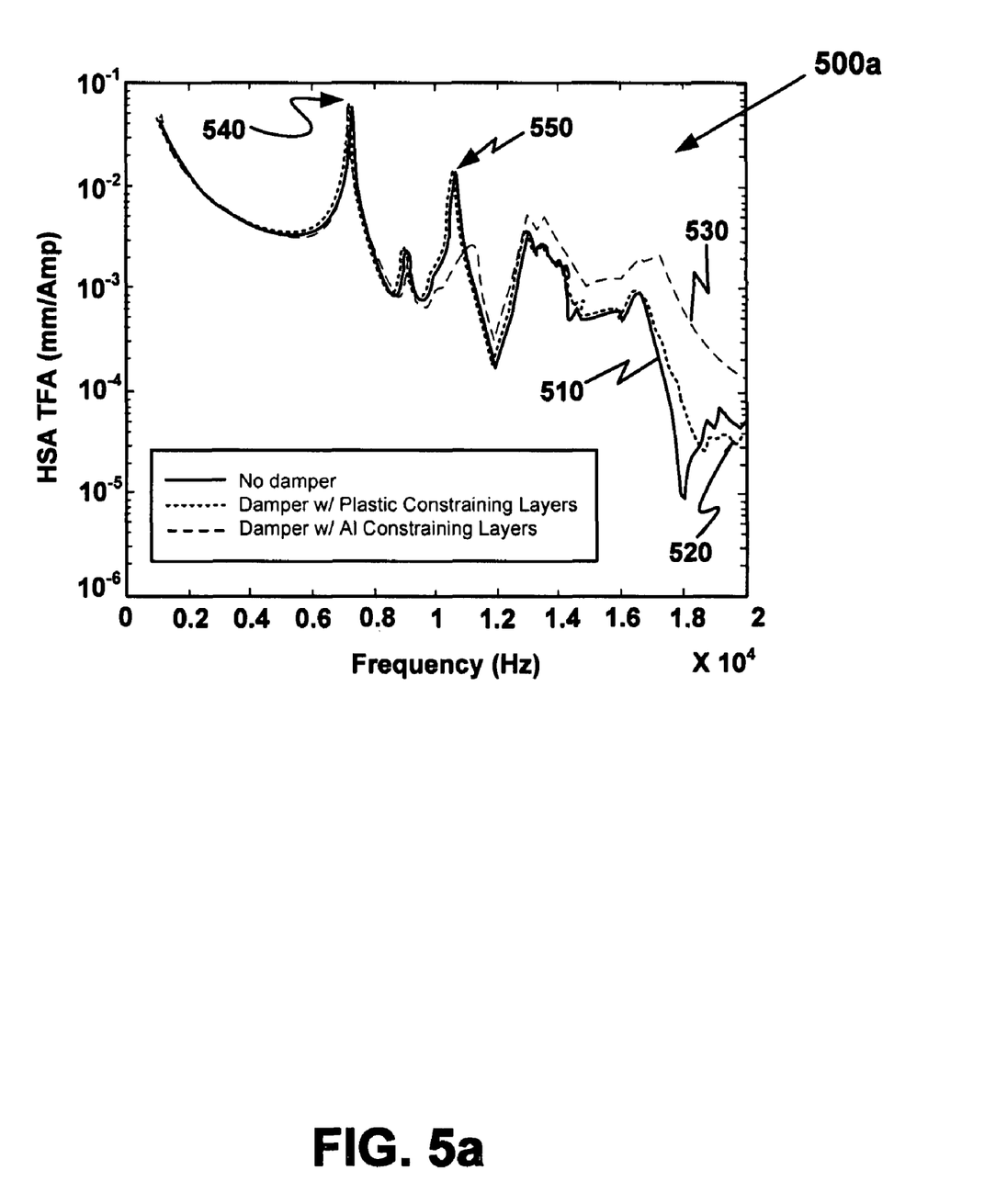
FIG. 5a is a transfer function analysis (TFA) of an HSA in accordance with one embodiment of the present invention.

With reference to FIG. 5a, a transfer function analysis (TFA) 500a of HSA 120 is presented in accordance with one embodiment of the present invention. Well known and understood in the art, a transfer function analysis are plots of frequencies of vibration of a structure and the relative gains of those frequencies of vibration. TFA 500a presents plots of frequencies of vibration of HSA 120 and the frequencies' gains. Plot 510 is a TFA plot of HSA 120 without CLD 230. Plot 520 is a TFA plot of HSA 120 with CLD 230 comprising plastic as the material for constraining layer (432, 436). Plot 530 is a TFA plot of HSA 120 with CLD 230 comprising aluminum as the material for constraining layer (432, 436).

Figure 5B:
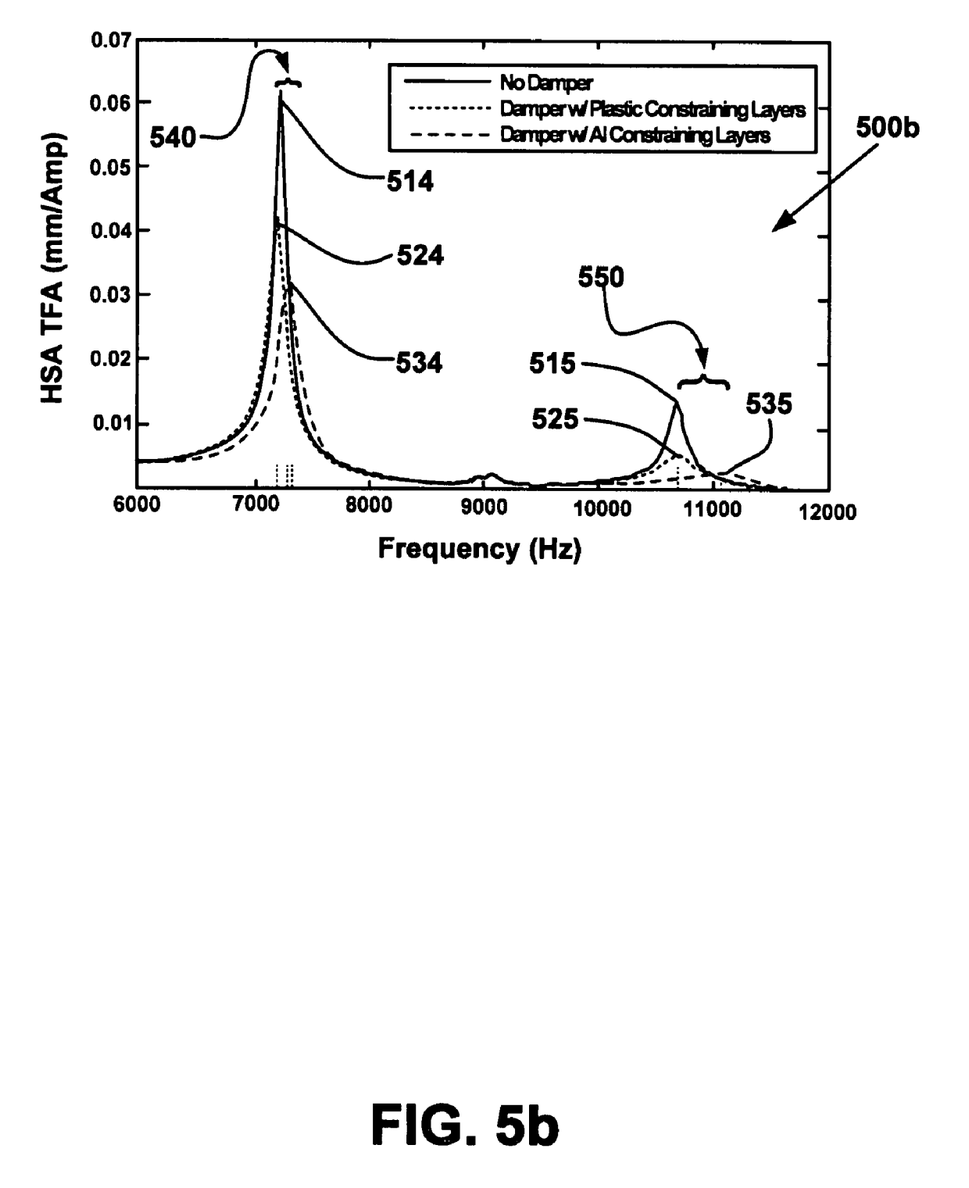
FIG. 5b is a TFA of an HSA in accordance with one embodiment of the present invention.

As can be seen from TFA 500a, the first system mode occurs at about 7 KHz and the second system mode occurs at about 11 KHz. With reference to FIG. 5b, a transfer function analysis (TFA) 500b of an HSA 120 is presented in accordance with one embodiment of the present invention. TFA 500b is a magnification of TFA 500a comprising the frequency spectrum containing the system modes for HSA 120.

It can be seen upon inspection of TFA 500b that first system mode 540 comprises a range of frequencies depending upon the material used for constraining layer (432, 436). Similarly, it can also be seen that second system mode 550 also comprises a range of frequencies depending upon the material used for constraining layer (432, 436).

TFA frequency 514 is the first system mode of HSA 120 without CLD 230. TFA frequency 514 occurs at about 7.3 KHz. TFA frequency 524 is the first system mode of HSA 120 with CLD 230 comprising plastic as the material for constraining layer (432, 436). TFA frequency 524 occurs at about 7.2 KHz, which is a reduction in frequency from TFA frequency 514. TFA frequency 534 is the first system mode of HSA 120 with CLD 230 comprising aluminum as the material for constraining layer (432, 436). TFA frequency 534 occurs at about 7.34 KHz, which is an increase in frequency from TFA frequency 514.

The reduction in the first system mode frequency from TFA frequency 514 to TFA frequency 524 and an increase in TFA frequency 514 to TFA frequency 535 is due in part to the differences in mass and stiffness of the constraining layer (432, 436) modeled in TFA plot 520 and TFA plot 530.

The range of frequencies comprising second system mode 550 is also due in part to differences in mass and stiffness of the constraining layer (432, 436) modeled in TFA plot 520 and TFA plot 530. TFA frequency 515 is the second system mode of HSA 120 without CLD 230. TFA frequency 515 occurs at about 10.7 KHz. TFA frequency 525 is the second system mode of HSA 120 with CLD 230 comprising plastic as the material for constraining layer (432, 436). TFA frequency 525 occurs similarly at about 10.7 KHz. TFA frequency 535 is the second system mode of HSA 120 with CLD 230 comprising aluminum as the material for constraining layer (432, 436). TFA frequency 535 occurs at about 11.1 KHz, which is an increase in frequency from TFA frequency (515, 525).

Variables in the design of HSA 120 can produce variations in the frequencies of the system modes as presented in TFA (500a, 500b). In addition to the variables of mass and stiffness of the constraining layer (432, 436), variations in the design of the overall stiffness and localized stiffness of HSA 120 and the overall mass and localized mass of HSA 120 can change the range of system modes by about 1 KHz. Depending upon the design of HSA 120 and the design of CLD 230, the range of system modes is from 6 KHz to 12 KHz.

Figure 6:
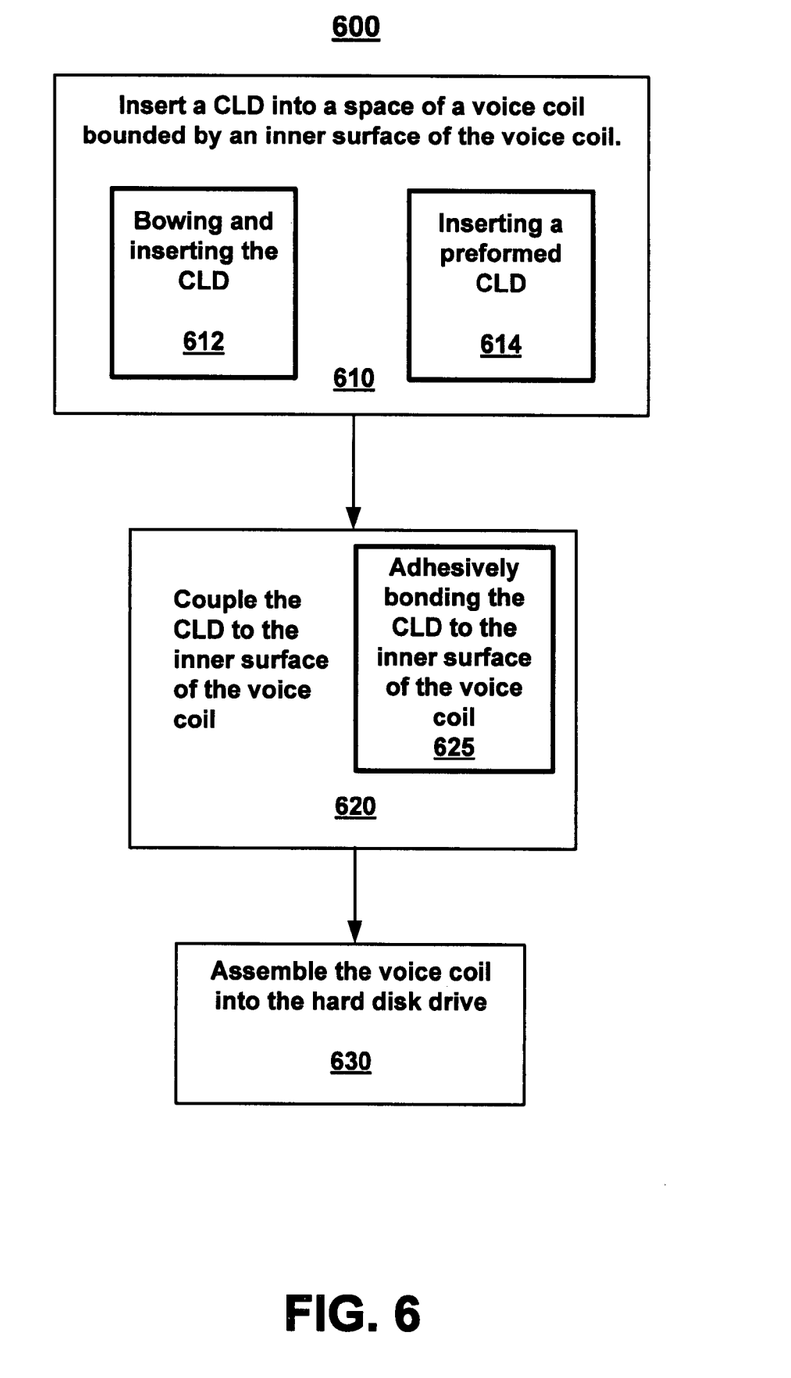
FIG. 6 is a flow chart illustrating a process for reducing the gain of a system frequency of an HDD in accordance with one embodiment of the present invention.

FIG. 6 is a flow chart illustrating a process 600 for reducing at least one gain of at least one system frequency in a hard disk drive, in accordance with an embodiment of the present invention. In one embodiment, process 600 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. Although specific components are disclosed in process 600, such components are examples of components for carrying out process 600. That is, the embodiments of the present invention are well suited to performing various other components or variations of the components recited in FIG. 6. Within the present embodiment, it should be appreciated that the components of process 600 may be performed by software, by hardware, by an assembly mechanism, through human interaction, or by any combination of software, hardware, assembly mechanism, and human interaction.

Process 600 will be described with reference to elements shown in FIG. 3 and FIG. 4.

In one embodiment, as shown at 610 of process 600, CLD 230 is inserted into a space of voice coil 220 bounded by an inner surface of voice coil 220. The wire comprising voice coil 220 delineates the space which receives CLD 230. The wire comprising voice coil 220 also defines inner surface 320, which is the boundary of the space which receives CLD 230.

In accordance with another embodiment of the present invention, inner surface 320 comprises a coil winding bobbin, wherein wire is wrapped around the coil winding bobbin to fabricate voice coil 220. In accordance with another embodiment of the present invention, CLD 230 is fabricated as part of the coil winding bobbin. The space bounded by a layer of wire coiled around the space of voice coil 220, and a coil winding bobbin, wherein a space of voice coil 220 is bounded by the inner surface of the coil winding bobbin are both operable to receiving CLD 230.

In one embodiment, as shown at 612 of process 600, CLD 230 upon insertion into the space of voice coil 220 defined by inner surface 320 is bowed such that curve 410 is formed. It is understood that bowing of CLD 230 prior to insertion, or bowing of CLD 230 after insertion to form curve 410, are both within the spirit of the embodiment of the present invention.

In one embodiment, as shown at 614 of process 600, CLD 230 is preformed such that curve 410 is formed in CLD 230 independently from its insertion into the space of voice coil 220. Pre-forming of CLD 230 to effect curve 410 can be carried out by methods well known in the art, such as: stamping constraining layer (432, 436) in a forming die to simulate curve 410 and laminating constraining layer (432, 436) to viscoelastic damping layer 434; and laminating constraining layer (432, 436) to viscoelastic damping layer 434 and forming the resulting laminate in a forming die to effect curve 410.

In one embodiment, as shown at 620 of process 600, CLD 230 is coupled to inner surface 320 of voice coil 220. Coupling CLD 230 to inner surface 320 of voice coil 220 can be effected by methods such as, fabricating a coil winding bobbin comprising CLD 230; and adhesively attaching CLD 230 to a coil winding bobbin prior to winding a wire around the coil winding bobbin.

In one embodiment, as shown at 625 of process 600, CLD 230 is adhesively bonded to inner surface 320 of voice coil 220. Methods of adhesive bonding are well known in the art. There are numerous adhesives that are operable to coupling CLD 230 to inner surface 320. The following list is not intended to be an exhaustive or all inclusive list of operable adhesives. Examples of adhesives operable to coupling CLD 230 to inner surface 320 are: cyanoacrylate, epoxy, thermally activated adhesive, pressure sensitive adhesive, UV cured adhesive, and thermal plastic adhesive. In accordance with an embodiment of the present invention, thermal plastic adhesive also includes thermal plastic adhesive that is present in the coil wire bonding process used for adhering the coils of wire to each other to form voice coil 220.

In one embodiment, as shown at 630 of process 600, voice coil 220 with CLD 230 coupled to inner surface 320 is assembled into HDD 100. With the assembly into HDD 100, of voice coil 220, in which CLD 230 is coupled to inner surface 320, at least one gain of at least one system frequency is reduced.

The present invention, in the various presented embodiments allows for the fabrication of an HSA and an HDD that have improved dynamic performance. The present invention, in the various presented embodiments improves dynamics with a minimal effect on the mass and stiffness of an HSA and hence the power consumption of the VCM and HDD, and effectiveness of the servo system.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A voice coil for a voice coil motor of a hard disk drive, said voice coil comprising:
   an inner surface of said voice coil, which bounds a central space of said voice coil;
   a first outer surface of said voice coil substantially parallel to a second outer surface of said voice coil; and
   a constrained layer damper attached to said inner surface of said voice coil by a coupler, said constrained layer damper comprising:
   a first constraining layer coupled to a first surface of a viscoelastic damping layer; and
   a second constraining layer coupled to a second surface of said viscoelastic damping layer, wherein said constrained layer damper is curved in a direction that is substantially perpendicular to said first outer surface of said voice coil and said second outer surface of said voice coil.

2. The voice coil of claim 1 wherein said coupler comprises a mounting pad juxtaposed to said inner surface of said voice coil.

3. The voice coil of claim 2 wherein said coupler further comprises an adhesive.

4. The voice coil of claim 3 wherein said adhesive comprises a thermal plastic adhesive.

5. The voice coil of claim 1 wherein said coupler comprises a coil winding bobbin.

6. The voice coil of claim 1 wherein said first constraining layer and said second constraining layer are about three times stiffer than said viscoelastic damping layer.

7. The voice coil of claim 1 wherein said first constraining layer and said second constraining layer are selected from the group of constraining layer materials consisting of: stainless steel, aluminum, polyimide, and polyester.

8. The voice coil of claim 1 wherein said viscoelastic damping layer comprises a pressure sensitive adhesive.

9. A hard disk drive comprising:
   a voice coil motor having a voice coil comprising:
   an inner surface of said voice coil, which bounds a space of said voice coil;
   a first outer surface of said voice coil substantially parallel to a second outer surface of said voice coil; and
   a constrained layer damper attached to said inner surface of said voice coil by a coupler, said constrained layer damper comprising:
   a first constraining layer coupled to a first surface of a viscoelastic damping layer; and
   a second constraining layer coupled to a second surface of said viscoelastic damping layer, wherein said constrained layer damper is curved in a direction that is substantially perpendicular to said first outer surface of said voice coil and said second outer surface of said voice coil.

10. The hard disk drive of claim 9 wherein said hard disk drive has at least one gain reduced of at least one system frequency in the range of 6 KHz to 12 KHz.

11. The hard disk drive of claim 9 wherein said coupler comprises a mounting pad juxtaposed to said inner surface of said voice coil.

12. The hard disk drive of claim 11 wherein said coupler further comprises an adhesive.

13. The hard disk drive of claim 12 wherein said adhesive comprises a thermal plastic adhesive.

14. The hard disk drive of claim 9 wherein said coupler comprises a coil winding bobbin.

15. The hard disk drive of claim 9 wherein said first constraining layer and said second constraining layer are selected from the group of constraining layer materials consisting of: stainless steel, aluminum, polyimide, and polyester.

16. The hard disk drive of claim 9 wherein said viscoelastic damping layer comprises a pressure sensitive adhesive.

* * * * *